(12) United States Patent
Jang et al.

(10) Patent No.: US 7,993,780 B2
(45) Date of Patent: Aug. 9, 2011

(54) PROCESS FOR PRODUCING CARBON ANODE COMPOSITIONS FOR LITHIUM ION BATTERIES

(75) Inventors: Bor Z. Jang, Centerville, OH (US); Aruna Zhamu, Centerville, OH (US)

(73) Assignee: Nanotek Instruments, Inc., Dayton, OH (US)

( * ) Notice: Subject to any disclaimer, the term of this patent is extended or adjusted under 35 U.S.C. 154(b) by 638 days.

(21) Appl. No.: 11/906,984

(22) Filed: Oct. 5, 2007

(65) Prior Publication Data

US 2009/0090640 A1   Apr. 9, 2009

(51) Int. Cl.
- H01M 4/82 (2006.01)
- H01M 2/00 (2006.01)
- H01M 6/16 (2006.01)
- C25B 1/00 (2006.01)
- D01F 9/12 (2006.01)
- C01B 31/04 (2006.01)

(52) U.S. Cl. ........... 429/231.4; 429/163; 429/332; 429/231.7; 205/555; 423/447.4; 423/447.1; 423/447.2; 423/448; 977/755; 29/623.1

(58) Field of Classification Search ............ None
See application file for complete search history.

(56) References Cited

U.S. PATENT DOCUMENTS

| | | |
|---|---|---|
| 3,700,502 A | 10/1972 | Watanabe et al. |
| 4,139,474 A | 2/1979 | Watanabe et al. |
| 4,243,615 A | 1/1981 | Watanabe et al. |
| 4,247,608 A | 1/1981 | Watanabe et al. |
| RE30,667 E | 7/1981 | Watanabe et al. |
| 4,423,261 A | 12/1983 | Watanabe et al. |
| 4,584,252 A | 4/1986 | Touzain et al. |
| 4,753,786 A * | 6/1988 | Watanabe et al. ........... 423/439 |
| 5,344,726 A | 9/1994 | Tanaka et al. |
| 5,635,151 A | 6/1997 | Zhang et al. |
| 5,908,715 A | 6/1999 | Liu et al. |
| 5,965,296 A | 10/1999 | Nishimura et al. |
| 6,040,092 A | 3/2000 | Yamada et al. |
| 6,087,043 A | 7/2000 | Tossici et al. |
| 6,139,989 A | 10/2000 | Kawakubo et al. |
| 6,495,291 B1 * | 12/2002 | Kohno et al. ............ 429/231.8 |
| 2006/0178966 A1 * | 8/2006 | Jung et al. ............ 705/35 |

OTHER PUBLICATIONS

Jimenez et al.; Carbon, vol. 23, No. 5, pp. 473-479; 1985.*
U.S. Appl. No. 11/893,398, filed Aug. 17, 2007, Jang, et al.
T. Zheng, Q. Zhong, and J. R. Dahn, J. Electrochem. Soc. 142 (1995) L211.
J. S. Xue and J. R. Dahn, J. Electrochem. Soc. 142 (1995) 3668.
F. Disma, L. Aymard, and J.-M. Tarascon, J. Electrochem. Soc., 143 (1996) 3959.
E. Peled, C. Menachem, A. Melman, J. Electrochem. Soc. 143 (1996) L4.

(Continued)

*Primary Examiner* — Melvin C Mayes
*Assistant Examiner* — Guinever S Gregorio (57) ABSTRACT

This invention provides a process for producing a lithium secondary battery. The process comprises: (a) providing a positive electrode; (b) providing a negative electrode comprising a carbonaceous material capable of absorbing and desorbing lithium ions, wherein the carbonaceous material is obtained by chemically or electrochemically treating a laminar graphite material to form a graphite crystal structure having an interplanar spacing $d_{002}$ of at least 0.400 nm as determined from a (002) reflection peak in powder X-ray diffraction; and (c) providing a non-aqueous electrolyte disposed between the negative electrode and the positive electrode to form the battery structure. This larger interplanar spacing (greater than 0.400 nm, preferably no less than 0.55 nm) implies a larger interstitial space between two graphene planes to accommodate a greater amount of lithium. The resulting battery exhibits an exceptionally high specific capacity, an excellent reversible capacity, and a long cycle life.

15 Claims, 5 Drawing Sheets

OTHER PUBLICATIONS

U. Rothlisberger and M. L. Klein, J. Am. Chem. Soc., 117, 42 (1995).
R. Yazami and M. Deschamps, J. Power Sources, 54 (1995) 411.
Y. Ein-Eli, V.R. Koch, J. Electrochem. Soc. 144 (1997) 2968.
C. Menachem, Y. Wang, J. Floners, E. Peled, S.G. Greenbaum, J. Power Sources, 76 (1998) 180.
H. Buqa, P. Golob, M. Winter, J.O. Bensenhard, J. Power Sources, 97-98 (2001) 122.
T. Takamura, H. Awano, T. Ura, K. Sumiya, J. Power Sources, 68 (1997) 114.
Y. P. Wu, C. Jiang, C. Wan and E. Tsuchida, Electrochem. Commu., 2 (2000) 272-275.
Y. P. Wu, C. Jiang, C. Wan and E. Tsuchida, "A Green Method for the Preparation of Anode Materials for Lithium Ion Batteries," J. Materials Chem., 11 (2001) 1233-1236.
Y. P. Wu, C.Y. Jiang, C.R. Wan, R. Holze, J. Appl. Electrochem., 32 (2002) 1011.
Y. P. Wu, C. Jiang, C. Wan, and R. Holze, Electrochem. Commu., 4 (2002) 483-487.
Y. P. Wu, E. Rahm, and R. Holze, J. Power Source, 114 (2003) 228-236.
K. Fukuda, et al "Foliated Natural Graphite as the Anode Material for Rechargeable Lithium-ion Cells," Journal of Power Source, 69 (1997) pp. 165-168.
X.Y. Yang, Materials Sci. & Eng A300 (2001) 278-283.
Z. H. Yang, Ceramics International, 33 (2007) 1573-77.
A. Xie, Materials Sci. & Eng. A 255(1998) 39-48.

* cited by examiner

PROCESS FOR PRODUCING CARBON ANODE COMPOSITIONS FOR LITHIUM ION BATTERIES

The present application is related to a co-pending application: Bor Z. Jang, et al. "Carbon Anode Compositions for Lithium Ion Batteries," U.S. patent application Ser. No. 11/893,398 (Aug. 17, 2007).

FIELD OF THE INVENTION

The present invention provides a process for producing carbonaceous materials for use as an anode active material in a secondary battery, particularly lithium-ion battery.

BACKGROUND

The description of prior art will be based primarily on the list of references presented at the end of this section.

Concerns over the safety of earlier lithium secondary batteries led to the development of lithium ion secondary batteries, in which pure lithium metal sheet or film was replaced by carbonaceous materials as the anode. The carbonaceous material may comprise primarily graphite that can be intercalated with lithium and the resulting graphite intercalation compound may be expressed as $Li_xC_6$, where x is typically less than 1. In order to minimize the loss in energy density due to this replacement, x in $Li_xC_6$ must be maximized and the irreversible capacity loss $Q_{ir}$ in the first charge of the battery must be minimized. Carbon anodes can have a long cycle life due to the presence of a protective surface-electrolyte interface layer (SEI), which results from the reaction between lithium and the electrolyte during the first several cycles of charge-discharge. The lithium in this reaction comes from some of the lithium ions originally intended for the charge transfer purpose. As the SEI is formed, the lithium ions become part of the inert SEI layer and become irreversible, i.e, they can no longer be the active element for charge transfer. Therefore, it is desirable to use a minimum amount of lithium for the formation of an effective SEI layer. In addition to SEI formation, $Q_{ir}$ has been attributed to graphite exfoliation caused by electrolyte solvent co-intercalation and other side reactions [Refs. 1-4].

The maximum amount of lithium that can be reversibly intercalated into the interstices between graphene planes of a perfect graphite crystal is generally believed to occur in a graphite intercalation compound represented by $Li_xC_6$ (x=1), corresponding to a theoretical specific capacity of 372 mAh/g. In other graphitized carbon materials than pure graphite crystals, there exists a certain amount of graphite crystallites dispersed in or bonded by an amorphous or disordered carbon matrix phase. The amorphous phase typically can store lithium to a specific capacity level higher than 372 mAh/g, typically up to 700 mAh/g, although a specific capacity higher than 1,000 mAh/g has been sporadically reported. Hence, the magnitude of x in a carbonaceous material $Li_xC_6$ varies with the proportion of graphite crystallites and can be manipulated by using different processing conditions, as exemplified in [Refs. 1-4]. However, an amorphous carbon phase alone tends to exhibit a low electrical conductivity (high charge transfer resistance) and, hence, a high polarization or internal power loss. Furthermore, conventional amorphous carbon-based anode materials also tend to give rise to a high irreversible capacity.

The so-called "amorphous carbons" commonly used as anode active materials are typically not purely amorphous, but contain some micro- or nano-crystallites with each crystallite being composed of a small number of graphene sheets (basal planes) that are stacked and bonded together by weak van der Waals forces. The number of graphene sheets varies between one and several hundreds, giving rise to a c-directional dimension (thickness Lc of crystallites) in the range of typically 0.34 nm to 100 nm. The length or width (La) of these crystallites is typically between tens of nanometers to microns. Among this class of carbon materials, soft and hard carbons made by low-temperature pyrolysis (550-1,000° C.) exhibit a reversible capacity of 400-800 mAh/g in the 0-2.5 V range [Refs. 1-3]. Dahn et al. have made the so-called house-of-cards carbonaceous material with enhanced capacities approaching 700 mAh/g [Refs. 1,2]. Tarascon's research group obtained enhanced capacities of up to 700 mAh/g by milling graphite, coke, or carbon fibers [Ref. 3]. Dahn et al. explained the origin of the extra capacity with the assumption that in disordered carbon containing some dispersed graphene sheets (referred to as house-of-cards materials), lithium ions are adsorbed on two sides of a single graphene sheet [Refs. 1,2]. It was also proposed that Li readily bonded to a proton-passivated carbon, resulting in a series of edge-oriented Li—C—H bonds. This provides an additional source of $Li^+$ in some disordered carbons [Ref. 5]. Other researchers suggested the formation of Li metal mono-layers on the outer graphene sheets [Ref. 6] of graphite nano-crystallites. The amorphous carbons of Dahn et al. were prepared by pyrolyzing epoxy resins and may be more correctly referred to as polymeric carbons. Polymeric carbon-based anode materials were also studied by Zhang, et al. [Ref. 16] and Liu, et al. [Ref. 17].

Peled and co-workers improved the reversible capacity of a graphite electrode to ~400 mAh/g by mild air oxidation [Ref. 4]. They showed that mild oxidation (burning) of graphite produces well-defined voids or nano-channels, having an opening of a few nanometers and up to tens of nanometers, on the surface of the graphite. They believed that these nano-channels were small enough to prevent co-intercalation of the solvent molecule but large enough to allow Li-ion penetration [Ref. 4]. These nano-channels were formed at the La-Lc interface, called "zigzag and armchair faces" between two adjacent crystallites, and in the vicinity of defects and impurities. Both natural and synthetic graphite materials typically have a wide variety of functional groups (e.g., carbonate, hydrogen, carboxyl, lactone, phenol, carbonyl, ether, pyrone, and chromene) at the edges of crystallites defined by La and Lc [Ref. 7]. These groups can react with lithium and/or electrolyte species to form a so-called in situ CB-SEI (chemically bonded solid electrolyte interface) [Ref. 4] on which, for example, carboxylic acid surface films are converted into Li-carboxylic salts.

Subsequently, several research groups have followed similar approaches to prepare mildly oxidized graphite anodes using a gaseous or liquid oxidant [Refs. 7-15]. For instance, Wu, et al. [Refs. 12-15] studied the electrochemical behaviors of natural graphite treated with $(NH_4)_2S_2O_8$, $Ce(SO_4)_2$, and $H_2O_2$. They similarly concluded that mild oxidation serves to (1) remove some active sites or defects in graphitic materials resulting in an improved surface structure; (2) form a dense layer of oxides acting as an efficient passivating film; and (3) produce nano-channels or micro-pores as storage sites and passages for lithium.

In summary, in addition to the above-cited three mechanisms, the following mechanisms for the extra capacity over the theoretical value of 372 mAh/g have been proposed [Ref. 4]: (i) lithium can occupy nearest neighbor sites; (ii) insertion of lithium species into nano-scaled cavities; (iii) in very disordered carbons containing large fractions of single graphene sheets (like the structure of a house of cards) lithium may be adsorbed on both sides of single layer sheets [Refs. 1,2]; (iv) correlation of H/C ratio with excess capacity led to a proposal that lithium may be bound somehow in the vicinity of the hydrogen atoms (possible formation of multi-layers of lithium on the external graphene planes of each crystallite in disordered carbons) [Ref. 6]; and (vi) accommodation of lithium in the zigzag and armchair sites [Ref. 4].

It is of significance to emphasize that the approach of mild oxidation causes the formation of nano-channels at the zigzag and armchair faces between two adjacent crystallites and in the vicinity of defects and impurities [e.g., as stated in the Abstract of Ref. 4]. X-ray diffraction studies indicate that "the chemical oxidation of the graphite powder does not involve the formation of an intermediary graphite intercalation compound (GIC), since the interlayer spacing remains constant (3.354 Å)" [Second paragraph of the right column, Page 2969 of Ref. 7]. This implies that the bulk of the crystallites remain intact; only the amorphous phase, defects and impurities, and the interface between a crystallite and the amorphous phase have been modified. The reversible capacity of the resulting mild oxidation-treated graphite anode rarely exceeds 400 mAh/g [Refs. 4,9] and, in most cases, still falls short of 372 mAh/g.

REFERENCES

1. T. Zheng, Q. Zhong, and J. R. Dahn, J. Electrochem. Soc. 142 (1995) L211.
2. J. S. Xue and J. R. Dahn, J. Electrochem. Soc. 142 (1995) 3668.
3. F. Disma, L. Aymard, and J.-M. Tarascon, J. Electrochem. Soc., 143 (1996) 3959.
4. E. Peled, C. Menachem, A. Melman, J. Electrochem. Soc. 143 (1996) L4.
5. U. Rothlisberger and M. L. Klein, J. Am. Chem. Soc., 117, 42 (1995).
6. R. Yazami and M. Deschamps, J. Power Sources, 54 (1995) 411.
7. Y. Ein-Eli, V. R. Koch, J. Electrochem. Soc. 144 (1997) 2968.
8. C. Menachem, Y. Wang, J. Floners, E. Peled, S. G. Greenbaum, J. Power Sources, 76 (1998) 180.
9. H. Buqa, P. Golob, M. Winter, J. O. Bensenhard, J. Power Sources, 97-98 (2001) 122.
10. T. Takamura, H. Awano, T. Ura, K. Sumiya, J. Power Sources, 68 (1997) 114.
11. Y. P. Wu, C. Jiang, C. Wan and E. Tsuchida, "Effects of catalytic oxidation on the electrochemical performance of common natural graphite as an anode material for lithium ion batteries," Electrochem. Commu., 2 (2000) 272-275.
12. Y. P. Wu, C. Jiang, C. Wan and E. Tsuchida, "A Green Method for the Preparation of Anode Materials for Lithium Ion Batteries," J. Materials Chem., 11 (2001) 1233-1236.
13. Y. P. Wu, C. Y. Jiang, C. R. Wan, R. Holze, J. Appl. Electrochem., 32 (2002) 1011.
14. Y. P. Wu, C. Jiang, C. Wan, and R. Holze, Electrochem. Commu., 4 (2002) 483-487.
15. Y. P. Wu, E. Rahm, and R. Holze, J. Power Source, 114 (2003) 228-236.
16. Zhang, et al., "Carbon Electrode Materials for Lithium Battery Cells and Method of Making Same," U.S. Pat. No. 5,635,151 (Jun. 3, 1997).
17. Lui, et al., "Composite Carbon Materials for Lithium Ion Batteries, and Method of Producing Same," U.S. Pat. No. 5,908,715 (Jun. 1, 1999).
18. R. Tossici, et al., "Lithium-ion Rechargeable Battery with Carbon-Based Anode," U.S. Pat. No. 6,087,043 (Jul. 11, 2000).
19. Tanaka, et al., "Carbon Anode for Secondary Battery," U.S. Pat. No. 5,344,726 (Sep. 6, 1994).
20. Nishimura, et al., "Nonaqueous Secondary Battery and a Method of Manufacturing a Negative Electrode Active Material," U.S. Pat. No. 5,965,296 (Oct. 12, 1999).
21. Yamada, et al., "Nonaqueous Secondary Battery," U.S. Pat. No. 6,040,092 (Mar. 21, 2000).
22. Kawakubo, et al., "Cathode Formed of Graphite/Carbon Composite for Lithium Ion Secondary Battery," U.S. Pat. No. 6,139,989 (Oct. 31, 2000).
23. Touzain, et al., "Insertion Compounds of Graphite with Improved Performances and Electrochemical Applications of those Compounds," U.S. Pat. No. 4,584,252 (Apr. 22, 1986).
24. N. Watanabe, et al., "High Energy Density Battery," U.S. Pat. No. 3,700,502 (Oct. 24, 1972).
25. Watanabe, et al., "Poly-Dicarbon Monofluoride," U.S. Pat. No. 4,139,474 (Feb. 13, 1979).
26. Watanabe, et al., "Poly-Dicarbon Monofluoride," U.S. Pat. No. 30,667 (Jul. 7, 1981).
27. Watanabe, et al., "Electrolytic Cell of High Voltage," U.S. Pat. No. 4,247,608 (Jan. 27, 1981).
28. Watanabe, et al., "Process for Preparing Poly-Dicarbon Monofluoride," U.S. Pat. No. 4,243,615 (Jan. 6, 1981).
29. Watanabe, et al., "Process for Producing a Graphite Fluoride Comprising Mainly Polydicarbon Monofluoride Represented by the Formula $(C_2F)n$," U.S. Pat. No. 4,423,261 (Dec. 27, 1983).
30. Watanabe, et al., "Method for Producing Graphite Fluoride," U.S. Pat. No. 4,753,786 (Jun. 28, 1988).

SUMMARY OF THE INVENTION

The present invention provides a process for producing a negative electrode (anode) material composition for use in a lithium secondary battery. In one preferred embodiment, the process comprises: (a) providing a positive electrode; (b) providing a negative electrode comprising a carbonaceous material capable of absorbing and desorbing lithium ions, wherein the carbonaceous material is obtained by chemically or electrochemically treating a laminar graphite material to form a graphite crystal structure having an interplanar spacing $d_{002}$ of at least 0.400 nm as determined from a (002) reflection peak in powder X-ray diffraction; and (c) providing a non-aqueous electrolyte disposed between the negative electrode and the positive electrode to form the battery structure. This interplanar spacing is also referred to as inter-layer or inter-graphene spacing, which is half of the height, c/2, of a graphite unit cell structure. This spacing is preferably at least 0.400 nm, more preferably at least 0.55 nm.

In one preferred embodiment, the process comprises chemically or electrochemically treating a laminar graphite material selected from natural graphite, synthetic graphite, highly oriented pyrolytic graphite, graphite fiber, carbon fiber, carbon nano-fiber, graphitic nano-fiber, spherical graphite or graphite globule, meso-phase micro-bead (MCMB), carbon nano-tube, or a combination thereof. For instance, natural flake graphite may be subjected to a deep oxidation treatment under a condition comparable to what has been commonly employed to prepare the so-called expandable graphite or stable graphite intercalation compound (GIC), but preferably with a higher degree of oxidation, to obtain a true graphite oxide essentially throughout the bulk of the material. This can be accomplished, for instance, by immersing graphite powder in a solution of sulfuric acid, nitric acid, and potassium permanganate for preferably 2-24 hours (details to be described later). The resulting acid-intercalated graphite compound is then subjected to washing and rinsing to remove essentially all the intercalants. The subsequently dried product is a heavily oxidized graphite powder, hereinafter referred to as graphite oxide (GO), which comprises carbon and oxygen (at a C/O weight ratio of typically 2.0/1.0 to 2.9/1.0) that is essentially sulfur-free and nitrogen-free. Powder X-ray diffraction indicates that the interplanar spacing is typically between 0.55 and 0.75 nm. These expanded interplanar spacings provide interstitial spaces that are ideal locations to accommodate lithium ions, atoms, or molecules. They appear to be large enough to accommodate at least two "layers" of lithium, as opposed to just one layer of sporadically distributed lithium atoms in a conventional interstitial space (of approximately 0.27 nm as part of an interplanar spacing of typically 0.335 nm) in either an untreated graphite or a so-called mildly oxidized graphite (wherein the interplanar spacing remains approximately <0.34 nm) [Refs. 4, 7-15].

Other examples of carbonaceous anode materials include graphite fluoride (GF), other halogenated graphite compounds, and other graphite compounds that have an interplanar spacing of 0.55 nm or above. Although graphite oxide (the type that exhibits a narrow particle size range and high specific surface area only [Ref. 23]) and certain types of graphite fluoride [Refs. 24-30] have been suggested for use as a positive electrode (cathode) active material in a lithium metal battery, these two groups of materials have never been used as an anode (negative electrode) active material in rechargeable lithium-ion batteries. There has been no implicit or explicit indication that either graphite fluoride or graphite oxide could be a potential anode active material. It has not been trivial or obvious that a lithium-ion secondary battery featuring either class of material would have a high specific capacity greater than the theoretical maximum of 372 mAh/g, a good reversible capacity, and a stable cycling behavior. We have surprisingly discovered these features only after intensive research and development efforts.

The carbonaceous material may be derived from particles or flakes of natural graphite, synthetic graphite, highly oriented pyrolytic graphite, graphite fiber, carbon fiber, carbon nano-fiber, graphitic nano-fiber, spherical graphite or graphite globule, meso-phase micro-bead (MCMB), meso-phase pitch, graphitic coke, or polymeric carbon. Meso-phase pitch, graphitic coke, or polymeric carbon may require additional graphitization treatment, typically at a temperature in the range of 1,500 and 3,000° C. prior to a deep oxidation or fluorination treatment. After the presently invented treatment (deep oxidation, fluorination, halogenation, etc), the graphite crystals (micro- or nano-crystallites), dispersed in an amorphous matrix, will exhibit expanded interstitial spaces, also characterized by a typical interplanar spacing of 0.55-0.9 nm. Thus, preferably, the carbonaceous material comprises a graphite oxide, graphite fluoride, or graphite-halogen compound (or domains of graphite oxide, graphite fluoride, or stable graphite-halogen compound in an amorphous carbon matrix).

A laminar graphite material (e.g., natural graphite particle) is typically composed of graphite crystals dispersed in or connected to an amorphous phase, along with other defects. Graphite particles (e.g., natural graphite flakes, MCMB particles, or artificially made graphite globules) may be mixed with a resin to form a composite. This composite may be heated at a temperature of typically 500-1,200° C. to convert the resin into a polymeric carbon or an amorphous carbon phase. Hence, in the presently invented negative electrode material composition, the carbonaceous material may further comprise an amorphous carbon phase or polymeric carbon, wherein the graphite particle or a graphite crystal structure therein is dispersed in or bonded by an amorphous carbon phase or polymeric carbon.

Alternatively, the amorphous carbon phase may be obtained from chemical vapor deposition, chemical vapor infiltration, or pyrolyzation of an organic precursor. Further alternatively, the carbonaceous material may comprise an electrically conductive binder material, wherein the graphite crystal structure is dispersed in or bonded by this conductive binder material. An electrically conductive binder material may be selected from coal tar pitch, petroleum pitch, meso-phase pitch, coke, a pyrolized version of pitch or coke, activated carbon, carbon black, or a conjugate chain polymer (intrinsically conductive polymer such as polythiophene, polypyrrole, or polyaniline.

In the preparation of a negative electrode material, typically carbon particles are bonded by a non-conductive material to form an integral anode member. Examples of con-conductive binder material are polyvinylidene fluoride (PVDF), polytetrafluoroethylene (PTFE), poly (vinyl fluoride), ethylene-propylene-diene copolymer (EPDM), styrene-butadiene rubber (SBR), their co-polymers, blends, derivatives, and their combinations Hence, the carbonaceous material may further comprise a non-conductive binder material, wherein graphite crystallites are dispersed in or bonded by the non-conductive binder material.

The carbonaceous material produced according to the present invention provides a specific capacity of typically greater than 500 mAh/g, often greater than 650 mAh/g, and even greater than 800 mAh/g, which all far exceed the theoretical specific capacity of 372 mAh/g for a graphite anode material. They also exhibit super multiple-cycle behaviors with a small capacity fade and a long cycle life.

DETAILED DESCRIPTION OF PREFERRED EMBODIMENTS

This invention is related to a process for producing a high-capacity lithium secondary battery, which is preferably a secondary battery based on a non-aqueous electrolyte or a polymer gel electrolyte. The shape of a lithium secondary battery can be cylindrical, square, button-like, etc. The present invention is not limited to any battery shape or configuration.

Figure 1:
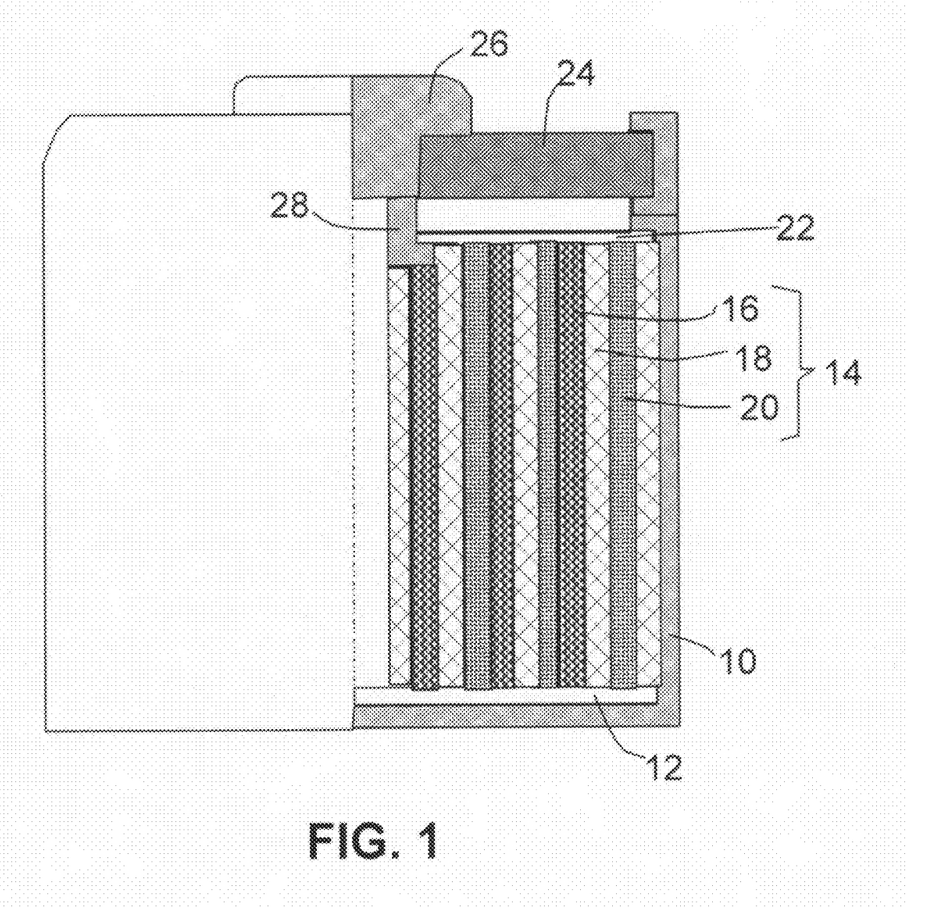
FIG. 1 Schematic of a cylinder-shape lithium ion battery.

As an example, a cylindrical battery configuration is shown in FIG. 1. A cylindrical case 10 made of stainless steel has, at the bottom thereof, an insulating body 12. An assembly 14 of electrodes is housed in the cylindrical case 10 such that a strip-like laminate body, comprising a positive electrode 16, a separator 18, and a negative electrode 20 stacked in this order, is spirally wound with a separator being disposed at the outermost side of the electrode assembly 14. The cylindrical case 10 is filled with an electrolyte. A sheet of insulating paper 22 having an opening at the center is disposed over the electrode assembly 14 placed in the cylindrical case 10. An insulating seal plate 24 is mounted at the upper opening of the cylindrical case 10 and hermetically fixed to the cylindrical case 10 by caulking the upper opening portion of the case 10 inwardly. A positive electrode terminal 26 is fitted in the central opening of the insulating seal plate 24. One end of a positive electrode lead 28 is connected to the positive electrode 16 and the other end thereof is connected to the positive electrode terminal 26. The negative electrode 20 is connected via a negative lead (not shown) to the cylindrical case 10 functioning as a negative terminal.

The positive electrode (cathode) active materials are well-known in the art. The positive electrode 16 can be manufactured by the steps of (a) mixing a positive electrode active material with a conductor agent (conductivity-promoting ingredient) and a binder, (b) dispersing the resulting mixture in a suitable solvent, (c) coating the resulting suspension on a collector, and (d) removing the solvent from the suspension to form a thin plate-like electrode. The positive electrode active material may be selected from a wide variety of oxides, such as manganese dioxide, lithium/manganese composite oxide, lithium-containing nickel oxide, lithium-containing cobalt oxide, lithium-containing nickel cobalt oxide, lithium-containing iron oxide and lithium-containing vanadium oxide. Positive electrode active material may also be selected from chalcogen compounds, such as titanium disulfate or molybdenum disulfate. More preferred are lithium cobalt oxide (e.g., $Li_xCoO_2$ where $0.8 \leq x \leq 1$), lithium nickel oxide (e.g., $LiNiO_2$) and lithium manganese oxide (e.g., $LiMn_2O_4$ and $LiMnO_2$) because these oxides provide a high cell voltage.

Acetylene black, carbon black, or ultra-fine graphite particles may be used as a conductor agent. The binder may be chosen from polytetrafluoroethylene (PTFE), polyvinylidene fluoride (PVDF), ethylene-propylene-diene copolymer (EPDM), or styrene-butadiene rubber (SBR), for example. Conductive materials such as electronically conductive polymers, meso-phase pitch, coal tar pitch, and petroleum pitch may also be used. Preferable mixing ratio of these ingredients may be 80 to 95% by weight for the positive electrode active material, 3 to 20% by weight for the conductor agent, and 2 to 7% by weight for the binder. The current collector may be selected from aluminum foil, stainless steel foil, and nickel foil. There is no particularly significant restriction on the type of current collector, provided the material is a good electrical conductor and relatively corrosion resistant. The separator may be selected from a synthetic resin nonwoven fabric, porous polyethylene film, porous polypropylene film, or porous PTFE film.

The negative electrode (anode), which the instant invention provides, is now explained in detail as follows: Carbon materials can assume an essentially amorphous structure (glassy carbon), a highly organized crystal (graphite crystal or crystallite), or a whole range of intermediate structures that are characterized by having various proportions and sizes of graphite crystallites and defects dispersed in an amorphous carbon matrix. Typically, a graphite crystallite is composed of a number of graphene sheets or basal planes (also referred to as a-b planes) that are bonded together through van der Waals forces in the c-axis direction, the direction perpendicular to the basal plane. These graphite crystallites are typically micron- or nanometer-sized in the a- or b-direction (these are called La dimension). The c-directional dimension (or thickness) is commonly referred to as Lc. The interplanar spacing of a perfect graphite is known to be approximately 0.335 nm (3.35 Å). The graphite crystallites are dispersed in or connected by crystal defects or an amorphous phase in a graphite particle, which can be a graphite flake, carbon/graphite fiber segment, carbon/graphite whisker, carbon/graphite nano-fiber, or carbon nano-tube. In the case of a carbon or graphite fiber segment, the graphene plates may be a part of a characteristic "turbostratic" structure.

According to a preferred embodiment of the present invention, a negative electrode (anode) material composition for use in a lithium secondary battery may comprise a carbonaceous material that is capable of absorbing and desorbing lithium ions. This carbonaceous material comprises a graphite crystal structure having an interplanar spacing $d_{002}$ of at least 0.400 nm, which is derived from a measured (002) reflection peak in powder X-ray diffraction. This interplanar spacing, also referred to as inter-layer or inter-graphene spacing (c/2 in a graphite unit cell structure), is preferably at least 0.55 nm and most preferably greater than 0.6 nm. Such an expanded interstitial space is substantially permanent as a result of a chemical or electrochemical treatment to a graphite crystal-containing material, such as natural graphite. This is as opposed to most of the intercalation treatments to form a graphite intercalation compound (GIC), in which the interplanar spacing restores to approximately the original magnitude once the intercalant species in the graphite intercalation compound are removed. Conventional GICs are prepared primarily for the purpose of producing flexible graphite through exfoliation of GICs. In contrast, the presently invented process serves to produce a negative electrode featuring a laminar graphite material with a permanently expanded inter-graphene spacing (typically between 0.4 and 2.0 nm), but without exfoliation. Thus far, it has not been recognized by those skilled in the art of lithium ion battery that laminar graphite materials with controllably expanded inter-planar spacings could be an outstanding negative electrode material.

As an example, a preferred embodiment of the present invention is a carbonaceous material composition, referred to as graphite fluoride (GF) with a chemical formula $[CF_x]_n$, where $0.5 \leq x \leq 1.0$. This chemical substance comprises the lamellar structure of carbon atoms in a graphite lattice with atoms of fluorine interposed between the graphene planes. However, GF differs from the conventional fluorine-intercalated graphite in several respects. For one, the fluorine is not easily removed from the graphite fluoride by simple heating to temperatures at which the intercalated product would freely release its intercalate. Typically, the intercalated product will freely release most of the fluorine intercalate at temperatures in the range of 350° C. to 400° C. The commonly produced graphite fluoride is thought to be a mixture of two different compounds, $[CF]_n$ and $[C_2F]_n$, having interplanar spacings of 5.8-5.9 Å and 8.8-9.0 Å, respectively. Depending upon the preparation conditions, the average interplanar spacing of a GF sample can vary between these two values. The fluorine atoms in graphite fluoride are covalently bonded to the carbon atoms, not just residing in the interstitial spaces as is true in fluorine-intercalated graphite. The fluorine-intercalated product has a higher conductivity than does the pristine graphite from which it is made. In contrast, graphite fluoride has a conductivity that is lower than that of the pristine graphite from which it is made.

In one preferred embodiment, the presently invented process comprises treating a laminar graphite material selected from natural graphite, synthetic graphite, highly oriented pyrolytic graphite, graphite fiber, carbon fiber, carbon nano-fiber, graphitic nano-fiber, spherical graphite or graphite globule, meso-phase micro-bead, carbon nano-tube, or a combination thereof. For instance, natural flake graphite may be subjected to a deep oxidation treatment under a condition comparable to what has been commonly employed to prepare the so-called expandable graphite or stable graphite intercalation compound, but with a higher degree of oxidation. This can be accomplished by immersing graphite powder in a solution of sulfuric acid, nitric acid or nitrate, and potassium permanganate for preferably 1-24 hours (details to be described later). The resulting acid-intercalated graphite compound is then subjected to vigorous washing and rinsing to remove essentially all the intercalants. The subsequently dried product is a heavily oxidized graphite powder, which comprises graphite oxide. The intercalation and the attendant oxidation process may also be accomplished electrochemically. Powder X-ray diffraction indicates that the interplanar spacing is typically between 0.55 and 0.75 nm. These expanded interplanar spacings provide interstitial spaces that are ideal locations to accommodate lithium ions or atoms. They appear to be large enough to accommodate at least two "layers" of lithium, as opposed to just one layer of lithium atoms in a conventional interstitial space (0.27 nm) with an interplanar spacing of typically 0.335 nm.

It may be noted that Tossici, et al, (in U.S. Pat. No. 6,087,043 (Jul. 11, 2000) [Ref. 18]), intercalated graphite with slightly larger potassium atoms to form a first-stage graphite intercalation compound, $KC_8$ for use as a starting anode active material. It was believed by Tossici, et al. that, during the first discharge cycle, most of the potassium ions were released, leaving behind slightly expanded interstitial spaces, with an interplanar spacing of 0.341 nm (an increase by only 0.06 nm). The expanded interplanar spacing appears to "enhance the kinetics of the electrochemical process, thus resulting in a high-rate carbon anode" [Ref. 18]. However, pre-intercalation with potassium atoms did not lead to an increased specific capacity (enhanced kinetics only). In contrast, the presently invented carbonaceous materials with significantly expanded interstitial spaces (typically greater than 0.4 nm) provide a dramatically enhanced specific capacity: typically 500-850 mAh/g or higher, as opposed to typically 225-350 mAh/g (albeit with a theoretical maximum of 372 mAh/g) for untreated graphite or potassium pre-intercalated graphite.

The laminar graphite material may be derived from particles or flakes of natural graphite, synthetic graphite, highly oriented pyrolytic graphite, graphite fiber, carbon fiber, carbon nano-fiber, graphitic nano-fiber, spheroidal graphite or graphite globule, meso-carbon micro-bead (MCMB), carbon nano-tube, meso-phase pitch, graphitic coke, or polymeric carbon. The spheroidal graphite, produced by spheroidizing natural graphite flakes using a special thermo-chemical procedure, is available from several commercial sources (e.g., Huadong Graphite Co., Pingdu, China). The spheroidal graphite has a basically identical crystalline structure as in natural graphite, having relatively well-ordered crystallites with an interplanar spacing of 0.336 nm. The MCMB is obtained by extracting meso-phase particles out of other less-ordered carbon matrix and then graphitizing the meso-phase particles. They are typically supplied as a highly graphitic form of graphite. Commercial sources of MCMBs include Alumina Trading (the U.S. distributor for the supplier, Osaka Gas Company of Japan) and Shanghai Shanshan Tech, China. Both the MCMB and spheroidal graphite may be subjected to the same chemical or electrochemical treatment for expanding the interstitial space as for natural graphite.

Although both non-graphitic carbon materials or graphitic carbon materials may be employed in practicing the present invention, graphitic materials, such as natural graphite, spheroidal natural graphite, meso-carbon microbeads, and carbon fibers (such as meso-phase carbon fibers), are preferably used. The carbonaceous material preferably has a numerical particle size (measured by a laser scattering method) that is smaller than about 25 µm, more preferably smaller than about 15 µm, further preferably smaller than about 10 µm, and most preferably smaller than about 6 µm. The smaller particle size reduces lithium diffusion distances and increases the rate capability of the anode, which is a factor in preventing lithium plating at the anode. In those instances where the particle is not spherical, the length scale parallel to the direction of lithium diffusion is the figure of merit. Larger particle sized materials may be used if the lithium diffusion coefficient is high. The diffusion coefficient of lithium in MCMB is about $10^{-10}$ $cm^2$/s. Synthetic graphite has a Li diffusion coefficient of about $10^{-8}$ $cm^2$/s. Hence, larger particle sizes graphite could be used if synthetic graphite is chosen.

Starting materials such as meso-phase pitch, graphitic coke, or polymeric carbon may require additional graphitization treatment, typically at a temperature in the range of 1,500 to 3,000° C. to form nano- or micro-crystallites dispersed in an amorphous carbon matrix. Such a blend or composite of graphitic phase (graphite crystallites) is then subjected to the same interstitial space expanding treatment; e.g., via a deep oxidation or fluorination procedure. The effects of this treatment include expanding the interstitial spaces in the graphite crystallites. Further, we speculate that, just like the mild oxidation treatment, the presently invented deep oxidation or fluorination treatment can serve to (1) remove some active sites or defects in graphitic materials, resulting in an improved surface structure and (2) form a dense layer of oxides or fluorides acting as an efficient passivating film. Both effects will significantly reduce the magnitude of irreversible capacity loss after first and subsequent cycles. Thus, preferably, the carbonaceous material comprises graphite oxide or graphite fluoride, or domains of graphite oxide or graphite fluoride in an amorphous carbon matrix.

A graphite material (e.g., natural graphite particle) is typically composed of graphite crystals dispersed in or connected to an amorphous phase, along with other defects. The proportion of the amorphous carbon phase (the disordered content) of a graphite material may be increased in the following manner: Graphite particles (e.g., natural graphite flakes, MCMB particles, or artificially made graphite globules) may be mixed with a resin to form a composite. This composite may be heated to a temperature of typically 500-1,000° C. for a sufficient period of time to convert the resin into a polymeric carbon or an amorphous carbon phase. Hence, in the presently invented negative electrode material composition, the carbonaceous material may further comprise an amorphous carbon phase or polymeric carbon, wherein the graphite particle or a graphite crystal structure therein is dispersed in or bonded by an amorphous carbon phase or polymeric carbon.

Alternatively, the amorphous carbon phase may be obtained from chemical vapor deposition (CVD), chemical vapor infiltration (CVI), or pyrolyzation of an organic precursor. CVD or CVI techniques are well-known in the art and have been utilized to cover a graphite material with an amorphous coating [e.g., Refs. 19-21]. Pyrolyzation of polymer-bonded graphite particles was studied by Kawakubo, et al. [Ref. 22]. However, these techniques have never been used to cover graphite particles or carbonaceous materials containing graphite crystallites with significantly expanded interstitial spaces. This is not a trivial task or an obvious extension of conventional CVD, CVI, or pyrolyzation treatments because a skilled person in the art would expect the underlying carbonaceous materials with expanded interstitial spaces (e.g., graphite oxide or graphite fluoride) to undergo significant chemical changes when subjected to a CVD or pyrolyzation treatment at a temperature typically higher than 500° C. in each case. Such a skilled person in the art would further expect that the resulting graphite material may return its interplanar spacing perhaps back to 0.335 nm. Surprisingly, this was not the case. After CVD or pyrolyzation treatment at a temperature lower than 750° C., no significant change in the interplanar spacing of expanded graphite materials studied was observed.

Further alternatively, the carbonaceous material may comprise an electrically conductive binder material, wherein the graphite crystal structure is dispersed in or bonded by this conductive binder material. An electrically conductive binder material may be selected from coal tar pitch, petroleum pitch, meso-phase pitch, coke, a pyrolized version of pitch or coke, or a conjugate chain polymer (intrinsically conductive polymer such as polythiophene, polypyrrole, or polyaniline.

In the preparation of a negative electrode material, typically carbon particles are bonded by a non-conductive material to form an integral anode member. Examples of conductive binder material are polyvinylidene fluoride (PVDF), polytetrafluoroethylene (PTFE), poly (vinyl fluoride), ethylene-propylene-diene copolymer (EPDM), styrene-butadiene rubber (SBR), their co-polymers, blends, derivatives, and their combinations. Hence, the carbonaceous material may further comprise a non-conductive binder material, wherein the graphite crystal structure is dispersed in or bonded by the non-conductive binder material.

A wide range of electrolytes can be used for practicing the instant invention. Most preferred are non-aqueous and polymer gel electrolytes although other types can be used. The non-aqueous electrolyte to be employed herein may be produced by dissolving an electrolytic salt in a non-aqueous solvent. Any known non-aqueous solvent which has been employed as a solvent for a lithium secondary battery can be employed. A non-aqueous solvent mainly consisting of a mixed solvent comprising ethylene carbonate (EC) and at least one kind of non-aqueous solvent whose melting point is lower than that of aforementioned ethylene carbonate and whose donor number is 18 or less (hereinafter referred to as a second solvent) may be preferably employed. This non-aqueous solvent is advantageous in that it is (a) stable against a negative electrode containing a carbonaceous material well developed in graphite structure; (b) effective in suppressing the reductive or oxidative decomposition of electrolyte; and (c) high in conductivity. A non-aqueous electrolyte solely composed of ethylene carbonate (EC) is advantageous in that it is relatively stable against decomposition through a reduction by a graphitized carbonaceous material. However, the melting point of EC is relatively high, 39 to 40° C., and the viscosity thereof is relatively high, so that the conductivity thereof is low, thus making EC alone unsuited for use as a secondary battery electrolyte to be operated at room temperature or lower. The second solvent to be used in a mixture with EC functions to make the viscosity of the solvent mixture lower than that of EC alone, thereby promoting the ion conductivity of the mixed solvent. Furthermore, when the second solvent having a donor number of 18 or less (the donor number of ethylene carbonate is 16.4) is employed, the aforementioned ethylene carbonate can be easily and selectively solvated with lithium ion, so that the reduction reaction of the second solvent with the carbonaceous material well developed in graphitization is assumed to be suppressed. Further, when the donor number of the second solvent is controlled to not more than 18, the oxidative decomposition potential to the lithium electrode can be easily increased to 4 V or more, so that it is possible to manufacture a lithium secondary battery of high voltage.

Preferable second solvents are dimethyl carbonate (DMC), methylethyl carbonate (MEC), diethyl carbonate (DEC), ethyl propionate, methyl propionate, propylene carbonate (PC), .gamma.-butyrolactone (.gamma.-BL), acetonitrile (AN), ethyl acetate (EA), propyl formate (PF), methyl formate (MF), toluene, xylene and methyl acetate (MA). These second solvents may be employed singly or in a combination of two or more. More desirably, this second solvent should be selected from those having a donor number of 16.5 or less. The viscosity of this second solvent should preferably be 28 cps or less at 25° C.

The mixing ratio of the aforementioned ethylene carbonate in the mixed solvent should preferably be 10 to 80% by volume. If the mixing ratio of the ethylene carbonate falls outside this range, the conductivity of the solvent may be lowered or the solvent tends to be more easily decomposed, thereby deteriorating the charge/discharge efficiency. More preferable mixing ratio of the ethylene carbonate is 20 to 75% by volume. When the mixing ratio of ethylene carbonate in a non-aqueous solvent is increased to 20% by volume or more, the solvating effect of ethylene carbonate to lithium ions will be facilitated and the solvent decomposition-inhibiting effect thereof can be improved.

Examples of preferred mixed solvent are a composition comprising EC and MEC; comprising EC, PC and MEC; comprising EC, MEC and DEC; comprising EC, MEC and DMC; and comprising EC, MEC, PC and DEC; with the volume ratio of MEC being controlled within the range of 30 to 80%. By selecting the volume ratio of MEC from the range of 30 to 80%, more preferably 40 to 70%, the conductivity of the solvent can be improved. With the purpose of suppressing the decomposition reaction of the solvent, an electrolyte having carbon dioxide dissolved therein may be employed, thereby effectively improving both the capacity and cycle life of the battery.

The electrolytic salts to be incorporated into a non-aqueous electrolyte may be selected from a lithium salt such as lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-metasulfonate ($LiCF_3SO_3$) and bis-trifluoromethyl sulfonylimide lithium [$LiN(CF_3SO_2)_2$]. Among them, $LiPF_6$, $LiBF_4$ and $LiN(CF_3SO_2)_2$ are preferred. The content of aforementioned electrolytic salts in the non-aqueous solvent is preferably 0.5 to 2.0 mol/l.

Example 1

Natural flake graphite, nominally sized at 45 μm, provided by Asbury Carbons (405 Old Main St., Asbury, N.J. 08802, USA) was milled to reduce the size to approximately 14 μm (Sample 1a). The chemicals used in the present study, including fuming nitric acid (>90% purity), sulfuric acid (95-98%), potassium chlorate (98%), and hydrochloric acid (37%), were purchased from Sigma-Aldrich and used as received. Graphite oxide (GO) samples were prepared according to the following procedure:

Sample 1A: A reaction flask containing a magnetic stir bar was charged with sulfuric acid (176 mL) and nitric acid (90 mL) and cooled by immersion in an ice bath. The acid mixture was stirred and allowed to cool for 15 min, and graphite (10 g) was added under vigorous stirring to avoid agglomeration. After the graphite powder was well dispersed, potassium chlorate (110 g) was added slowly over 15 min to avoid sudden increases in temperature. The reaction flask was loosely capped to allow evolution of gas from the reaction mixture, which was stirred for 24 hours at room temperature. On completion of the reaction, the mixture was poured into 8 L of deionized water and filtered. The sample was re-dispersed and washed in a 5% solution of HCl to remove sulphate ions. The filtrate was tested intermittently with barium chloride to determine if sulphate ions are present. The HCl washing step was repeated until this test was negative. The sample was then washed repeatedly with deionized water until the pH of the filtrate was neutral. The resulting slurry was spray-dried and stored in a vacuum oven at 60° C. until use.

Sample 1B: The same procedure as in Sample 1A was followed, but the reaction time was 48 hours.

Sample 1C: The same procedure as in Sample 1A was followed, but the reaction time was 96 hours.

Figure 2:
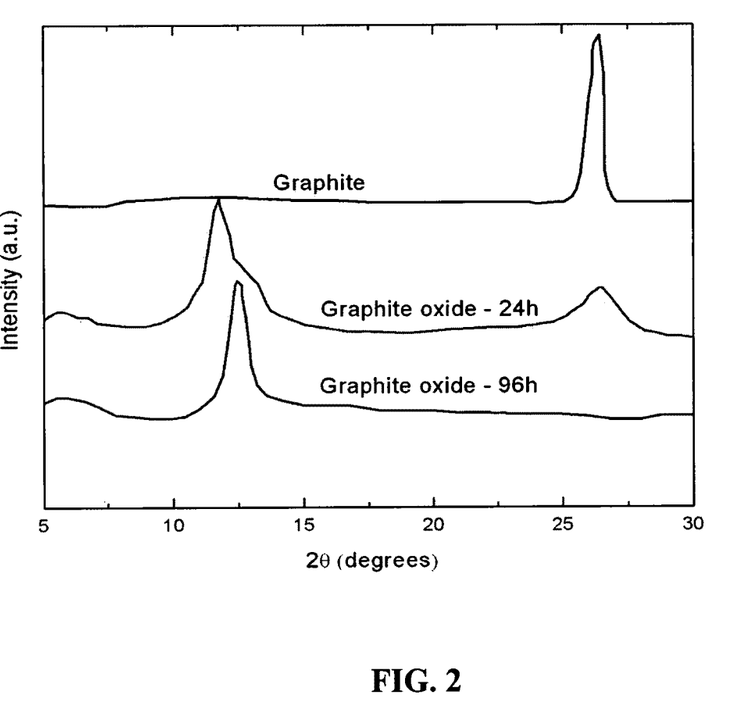
FIG. 2 X-ray diffraction curves for natural graphite and graphite oxide samples, indicating the shift of a (002) plane-induced peak from an interplanar spacing of 0.335 nm for pristine graphite to 6.5-7.5 nm for deeply oxidized graphite.

X-ray diffraction studies (FIG. 2) showed that after a treatment of 24 hours, a significant proportion of graphite has been transformed into graphite oxide. The peak at 2θ=26.3°, corresponding to an interplanar spacing of 0.335 nm (3.35 Å) for pristine natural graphite (top curve in FIG. 2), was significantly reduced in intensity (middle curve) after a deep oxidation treatment for 24 hours. The curves for treatment times of 48 and 96 hours are essentially identical (bottom curve), showing that essentially all of the graphite crystals have been converted into graphite oxide with an interplanar spacing of 6.5-7.5 Å (the 26.3° peak has totally disappeared).

Example 2

Samples 2A, 2B, 2C, and 2D were prepared according to the same procedure used for Sample 1B, but the starting graphite materials were highly oriented pyrolytic graphite (HOPG), graphite fiber, graphitic carbon nano-fiber, and spheroidal graphite, respectively. Their final interplanar spacings are 6.6 Å, 7.3 Å, 7.3 Å, and 6.6 Å, respectively. Their un-treated counterparts are referred to as Sample 2a, 2b, 2c, and 2d, respectively.

Example 3

Graphite oxide (Sample 3A) was prepared by oxidation of natural graphite flakes (original size of 200 mesh, from Huadong Graphite Co., Pingdu, China, milled to approximately 15 μm, referred to as Sample 3a) with sulfuric acid, sodium nitrate, and potassium permanganate according to the method of Hummers [U.S. Pat. No. 2,798,878, Jul. 9, 1957]. In this example, for every 1 gram of graphite, we used a mixture of 22 ml of concentrated sulfuric acid, 2.8 grams of potassium permanganate, and 0.5 grams of sodium nitrate. The graphite flakes were immersed in the mixture solution and the reaction time was approximately one hour at 35° C. It is important to caution that potassium permanganate should be gradually added to sulfuric acid in a well-controlled manner to avoid overheat and other safety issues. Upon completion of the reaction, the mixture was poured into deionized water and filtered. The sample was then washed repeatedly with deionized water until the pH of the filtrate was approximately 5. The slurry was spray-dried and stored in a vacuum oven at 60° C. for 24 hours. The interlayer spacing of the resulting laminar graphite oxide was determined by the Debye-Scherrer X-ray technique to be approximately 0.73 nm (7.3 Å).

Example 4

Graphite oxide (Sample 4A) was prepared by oxidation of meso-carbon micro-beads (MCMBs) according to the same procedure used in Example 3. MCMB 2528 microbeads (Sample 4a) were supplied by Alumina Trading, which is the U.S. distributor for the supplier, Osaka Gas Company of Japan. This material has a density of about 2.24 g/cm$^3$; a particle size maximum for at least 95% by weight of the particles of 37 microns; median size of about 22.5 microns and an interplanar distance of about 0.336 nm. After deep oxidation treatment, the interplanar spacing in the resulting graphite oxide micro-beads is approximately 0.76 nm.

Example 5

Amoco P-100 graphitized carbon fiber (Sample 5a), having an interplanar spacing of 3.37 Å (0.337 nm) and a fiber diameter of 10 μm was first halogenated with a combination of bromine and iodine at temperatures ranging from 75° C. to 115° C. to form a bromine-iodine intercalation compound of graphite as an intermediate product. The intermediate product was then reacted with fluorine gas at temperatures ranging from 275° C. to 450° C. to form the $CF_x$. The value of x in the $CF_x$ samples was approximately 0.6-0.9. X-ray diffraction curves typically show the co-existence of two peaks corresponding to 0.59 nm and 0.88 nm, respectively. Sample 5A exhibits substantially 0.59 nm peak only and Sample 5B exhibits substantially 0.88 nm peak only.

Example 6

A $CF_{0.68}$ sample obtained in EXAMPLE 5 was exposed at 250° C. and 1 atmosphere to vapors of 1,4-dibromo-2-butene ($BrH_2C$—$CH$=$CH$—$CH_2Br$) for 3 hours. It was found that two-thirds of the fluorine was lost from the graphite fluoride sample. It is speculated that 1,4-dibromo-2-butene actively reacts with graphite fluoride, removing fluorine from the graphite fluoride and forming bonds to carbon atoms in the graphite lattice. The resulting product (Sample 6A) is mixed halogenated graphite, likely a combination of graphite fluoride and graphite bromide.

Example 7

Natural graphite flakes, a sieve size of 200 to 250 mesh, were heated in vacuum (under less than $10^{-2}$ mmHg) for about 2 hours to remove the residual moisture contained in the graphite. Fluorine gas was introduced into a reactor and the reaction was allowed to proceed at 375° C. for 120 hours while maintaining the fluorine pressure at 200 mmHg. This was based on the procedure suggested by Watanabe, et al. disclosed in U.S. Pat. No. 4,139,474) [Ref. 25]. The powder product obtained was black in color. The fluorine content of the product was measured as follows. The product was burnt according to the oxygen flask combustion method and the fluorine was absorbed into water as hydrogen fluoride. The amount of fluorine was determined by employing a fluorine ion electrode. From the result, we obtained a GF (Sample 7A) having an empirical formula $(CF_{0.58})_n$. X-ray diffraction indicated a major (002) peak at 2θ=10°, corresponding to an interplanar spacing of 9.0 Å.

Sample 7B was obtained in a manner similar to that for Sample 7A, but at a reaction temperature of 640° C. for 5 hours. The chemical composition was determined to be $(CF_{0.93})_n$. X-ray diffraction indicated a major (002) peak at 2θ=13.5°, corresponding to an interplanar spacing of 5.85 Å.

Example 8

Two polymeric carbon-coated GO samples (Samples 8-A and 8-B) were prepared by mixing GO particles (prepared in Example 3 and Example 4, respectively) with a phenol resin to obtain a mixture comprising 20% by volume of phenol resin in each case. The mixture was cured at 200° C. for one hour and then carbonized in an argon atmosphere at a temperature of 500° C. Then, the carbonized product was ground and milled to obtain particles of 1 to 23 μm, with an average diameter of approximately 13 μm. Surprisingly, the interplanar spacing was determined to remain approximately the same (0.73 nm and 0.76 nm, respectively) even though the GO particles have experienced a temperature as high as 500° C.

Example 9

Natural flake graphite, milled to an average size of approximately 14 microns, was subjected to the same fluorination treatment as described in Example 7 and determined to be $CF_{0.58}$ (Sample 7A). The resulting powder was subjected to a chemical vapor deposition (CVD) of amorphous carbon according to a procedure suggested by Tanaka, et al., U.S. Pat. No. 5,344,726 [Ref. 19]. A $CF_{0.58}$ sample powder of 50 mg was placed in a quartz tube reactor, and then argon gas and propane gas were supplied from an argon supply line and a propane supply line, respectively. Then, a propane concentration of raw gas was set to 10 mole % by handling needle valves. Flow velocity of the raw gas was set to 12.7 cm/min and an amount of supply of propane was set to 0.05 mol/h. It may be noted that a hydrocarbon or its derivatives other than propane may be used as a raw material. More specifically, an aliphatic hydrocarbon, an aromatic hydrocarbon, an alicyclic hydrocarbon or the like may be used. Further specifically, methane, ethane, butane, benzene, toluene, naphthalene, acetylene, biphenyl and substitution products thereof may be used. The powder was heated by a furnace at approximately 750° C., whereby propane supplied from a pyrex tube was pyrolytically decomposed with a pyrolysis carbon being deposited on the surface of the graphite fluoride powder. The resulting material was milled to become fine particles of approximately 16.5 microns, which are essentially amorphous carbon-coated GF particles (Sample 9A).

Example 10

Sample 10A was identical to Sample 3A, which was subsequently bonded by a conducting polymer-based binder resin to prepare a sample for Example 20.

Examples 11-20

The anode active materials prepared in Examples 1-10 were separately incorporated into a lithium ion battery to prepare samples for Examples 11-20, respectively. The cathode of a lithium ion battery was prepared in the following way. First of all, 91% by weight of lithium cobalt oxide powder $LiCoO_2$, 3.5% by weight of acetylene black, 3.5% by weight of graphite, and 2% by weight of ethylene-propylene-diene monomer powder were mixed together with toluene to obtain a mixture. The mixture was then coated on an aluminum foil (30 μm) serving as a current collector. The resulting two-layer aluminum foil-active material configuration was then hot-pressed to obtain a positive electrode.

The powder particles obtained in Examples 1-9 were separately mixed with, as a binder, 2.2% by weight of styrene/butadiene rubber and 1.1% by weight of carboxylmethyl cellulose to obtain a mixture (a precursor to an anode active material), which was then coated on a copper foil to be employed as a collector. After being dried, the powder/resin mixture-copper foil configuration was hot-pressed to obtain a negative electrode (in Examples 11-19).

In Example 20, a portion of the powder particles prepared for Sample 1D was mixed with an electronically conductive polymer, polyaniline. Polyaniline-maleicacid-dodecylhydrogensulfate salt was synthesized directly via emulsion polymerization pathway using benzoyl peroxide oxidant, sodium dodecyl sulfate surfactant, and maleic acid as dopants. Dry polyaniline powder was dissolved in DMF up to 2% w/v to form a solution. The graphite oxide particles were then dispersed in this solution to form a suspension, which was then coated on a copper foil to be employed as a collector. Upon removal of the solvent, the powder/resin mixture-copper foil configuration was hot-pressed to obtain a negative electrode.

A positive electrode, a separator composed of a porous polyethylene film, and a negative electrode was stacked in this order. The stacked body was spirally wound with a separator layer being disposed at the outermost side to obtain an electrode assembly as schematically shown in FIG. 1.

Hexafluorolithium phosphate ($LiPF_6$) was dissolved in a mixed solvent consisting of ethylene carbonate (EC) and methylethyl carbonate (MEC) (volume ratio: 50:50) to obtain a non-aqueous electrolyte, the concentration of $LiPF_6$ being 1.0 mol/l (solvent).

Finally, the electrode assembly and the non-aqueous electrolyte were placed in a bottomed cylindrical case made of stainless steel, thereby obtaining a cylindrical lithium secondary battery as shown in FIG. 1.

In order to compare the electrochemical behaviors of carbonaceous anode materials prepared in Examples 1-10, we used a method analogous to that used by Wu, et al. [Ref. 12]. The results are summarized in Table 1.

TABLE 1

Specific capacity and reversible specific capacity of carbonaceous anode active materials.

| Sample No. | Anode active Material | Interplanar spacings Å | Specific capacity mAh/g | Reversible capacity mAh/g | Retention ratio, % |
|---|---|---|---|---|---|
| 1a | Natural graphite | 3.35 | 260 | 184 | 70.8 |
| 1A | GO, 24 hrs | 3.35-7.5 | 545 | 495 | 90.8 |
| 1B | GO, 48 hrs | 6.5-7.5 | 742 | 652 | 87.9 |
| 1C | GO, 96 hrs | 6.5-7.5 | 752 | 662 | 88.0 |
| 2a | HOPG | 3.35 | 285 | 205 | 71.9 |
| 2A | HOPG oxide | 6.6 | 685 | 623 | 90.9 |
| 2b | Graphite fiber | 3.4 | 343 | 285 | 83.1 |
| 2B | Oxidized GF | 7.3 | 764 | 654 | 85.6 |
| 2c | CNF | 3.36 | 264 | 189 | 71.6 |
| 2C | Oxidized CNF | 7.3 | 712 | 630 | 88.5 |
| 2d | Spheroidal Gr | 3.35 | 285 | 202 | 70.9 |
| 2D | Oxidized S-Gr | 7.5 | 747 | 665 | 89.0 |
| 3a | Natural graphite | 3.35 | 265 | 190 | 71.7 |
| 3A | GO, Hummers | 7.3 | 732 | 644 | 88.0 |
| 4a | MCMB | 3.36 | 310 | 270 | 87.1 |
| 4A | Oxidized MCMB | 7.6 | 756 | 667 | 88.2 |
| 5a | Graphite fiber | 3.4 | 325 | 280 | 86.2 |
| 5A | $CF_{0.9}$ | 5.9 | 635 | 576 | 90.7 |
| 5B | $CF_{0.6}$ | 8.8 | 840 | 760 | 90.5 |
| 6A | $CBrF_x$ | 8.4 | 792 | 721 | 91.0 |
| 7A | $CF_{0.58}$ | 9 | 856 | 771 | 90.1 |
| 7B | $CF_{0.93}$ | 5.85 | 643 | 575 | 89.4 |
| 8A | 3A+C-coated | 7.3 | 762 | 6S7 | 86.2 |
| 8B | 4A+C-coated | 7.6 | 782 | 685 | 87.6 |
| 9A | 7A+CVD-C | 9 | 875 | 785 | 89.7 |
| 10A | PANi-bonded | 7.3 | 732 | 64S | 88.1 |

Figure 3:
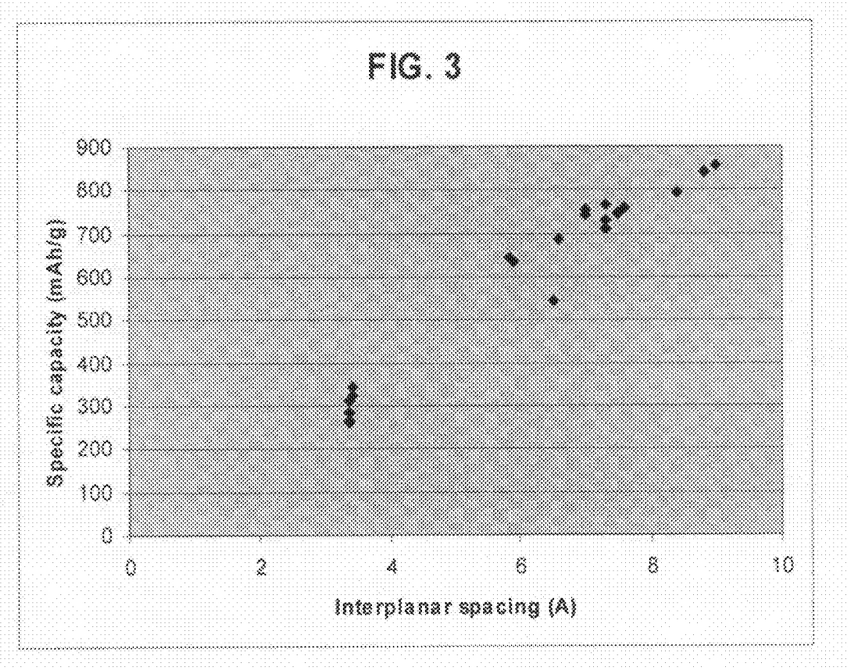
FIG. 3 The specific capacity of several groups of carbonaceous anode materials plotted as a function of the interplanar spacing.
Figure 4:
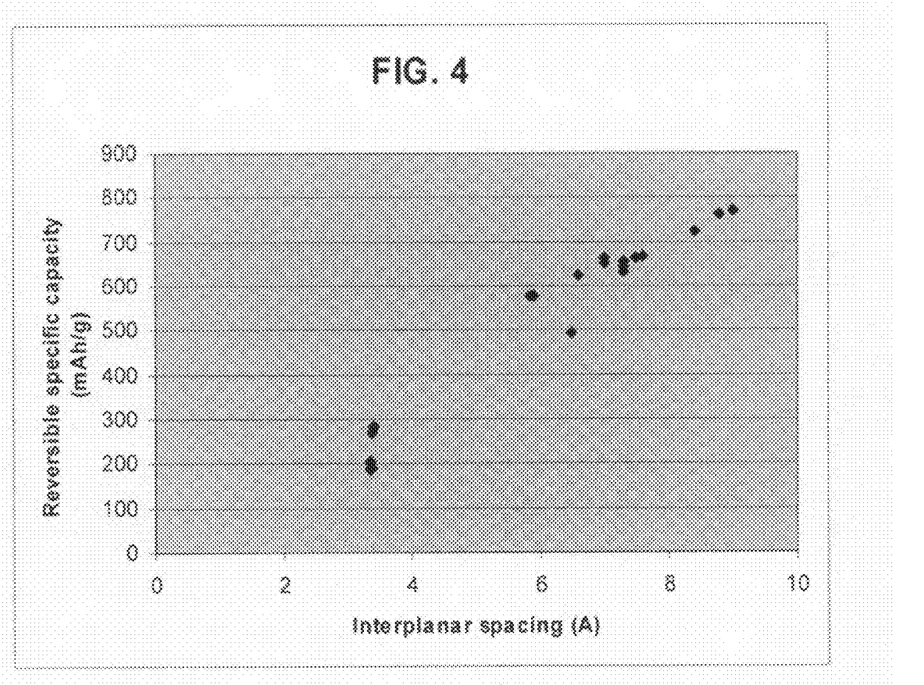
FIG. 4 The reversible specific capacity (after first cycle) of several groups of carbonaceous anode materials plotted as a function of the interplanar spacing.

The following significant observations are made from Table 1 and related charts (FIG. 3-FIG. 5):

(1) In every group of carbonaceous anode materials studied, both the specific capacity and reversible capacity (after first cycle) of materials with expanded interstitial spaces (interplanar spacing greater than 0.55 nm or 5.5 Å) are significantly higher than those of their un-expanded, counterparts. For instance, 1A, 1B, 1C, and 1D (graphite oxide) are all greater than 1a (natural graphite).

(2) The retention ratio, defined as the reversible capacity/ specific capacity, typically 85% to 91% for a treated sample (with expanded interstitial spaces) is always better than that typically 70% to 83%) for a corresponding un-treated sample.

(3) Both the total specific capacity (FIG. 3) and reversible capacity (FIG. 4) appear to increase with increasing interplanar spacing when all the data points for Samples 1-10 are plotted on the same chart (regardless the type of carbonaceous materials). If we extrapolate the curve in FIG. 3 and draw a horizontal straight line starting at a vertical axis coordinate point of 372 mAh/g, this straight line and the data curve intersect at an interplanar spacing of approximately 4.0 Å or 0.4 nm. This implies that any graphitic material with an expanded interstitial space (such that the interplanar spacing is 4.0 Å or greater) will likely exhibit a specific capacity greater than the theoretical capacity of its un-expanded counterpart. Hence, it is fair to say that the present invention provides a powerful platform technology for enhancing the specific capacity of carbonaceous anode materials.

(4) The data for Samples 8A, 8B, and 9A demonstrate that an amorphous carbon coating on graphitic carbon particles can further enhance the electrochemical responses of the materials with expanded interstitial spaces. This coating may be obtained via carbonization of a polymer or chemical vapor deposition of carbon.

Figure 5:
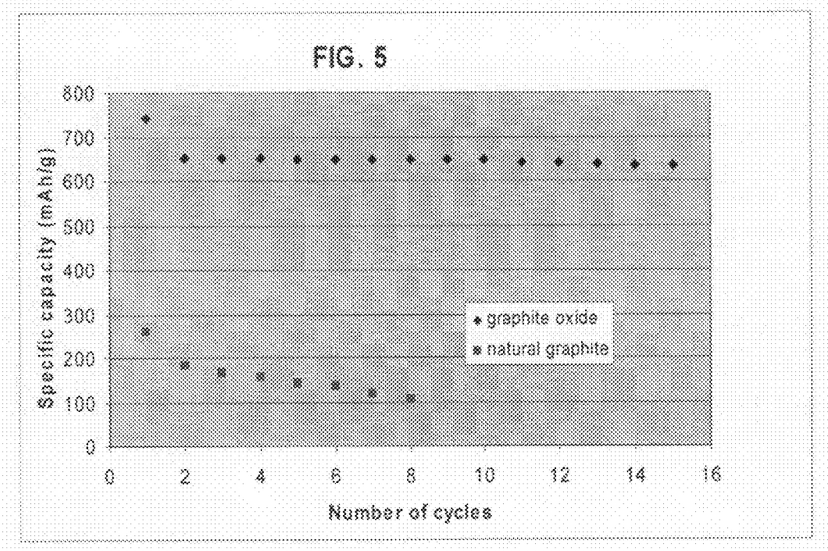
FIG. 5 The specific capacity of carbon anode materials based on natural graphite and its oxide counterpart.

(5) As demonstrated in FIG. 5, the treated carbonaceous material with expanded interstitial spaces is also more capable of retaining the specific capacity as the secondary battery undergoes cycles of charge and discharge. It is speculated that the associated treatment has provided a stable solid electrolyte interface (SEI) that has effectively prevented the continued consumption of lithium ions in forming irreversible lithium compounds. Those who are skilled in the art would have predicted that the expanded interstitial spaces favor the co-intercalation of solvents, which has been one of the primary causes of capacity fade. To the contrary and quite surprisingly, the expanded interstitial spaces (with an interplanar spacing up to 9.0 Å) did not seem to have any solvent co-intercalation issue.

The invention claimed is:

1. A process for producing a lithium secondary battery, said process comprising:
   (a) providing a positive electrode;
   (b) providing a negative electrode comprising a graphite oxide or graphite fluoride capable of absorbing and desorbing lithium ions, wherein said graphite oxide or graphite fluoride is obtained by chemically or electrochemically treating a laminar graphite material to form a graphite crystal structure having an interplanar spacing $d_{002}$ of at least 0.55 nm as determined from a (002) reflection peak in powder X-ray diffraction; and
   (c) providing a non-aqueous electrolyte disposed between said negative electrode and said positive electrode to form said battery.

2. The process as defined in claim 1, wherein said laminar graphite is selected from natural graphite, synthetic graphite, highly oriented pyrolytic graphite, graphite fiber, carbon fiber, carbon nano-fiber, graphitic nano-fiber, spherical graphite or graphite globule, meso-phase micro-bead, carbon nano-tube, or a combination thereof.

3. The process as defined in claim 1, wherein said chemical or electrochemical treatment comprises a step of chemically or electrochemically intercalating said laminar graphite material.

4. The process as defined in claim 1, wherein said chemical or electrochemical treatment comprises a step of chemically or electrochemically oxidizing said laminar graphite material or reacting said laminar graphite with a halogen element or halogen compound.

5. The process as defined in claim 1, wherein step (c) comprises introducing said electrolyte into pores of a separator layer disposed between said anode and said cathode.

6. The process according to claim 1, wherein said positive electrode comprises lithium cobalt oxide, lithium nickel oxide, lithium manganese oxide, or a combination thereof.

7. The process as defined in claim 1, wherein said step of chemically or electrochemically treating a laminar graphite material is followed by dispersing said treated laminar graphite material in an amorphous carbon or polymeric carbon phase.

8. The process of claim 7, wherein said amorphous carbon phase is obtained from chemical vapor deposition, chemical vapor infiltration, or pyrolyzation of an organic precursor.

9. The process as defined in claim 1, wherein said step of chemically or electrochemically treating a laminar graphite material is followed by dispersing said treated laminar graphite material in an electrically conductive binder material.

10. The process as defined in claim 9, wherein said electrically conductive binder material comprises coal tar pitch, petroleum pitch, meso-phase pitch, coke, activated carbon, carbon black, a conjugate chain polymer, or a derivative thereof.

11. The process as defined in claim 1, wherein said step of chemically or electrochemically treating a laminar graphite material is followed by dispersing said treated laminar graphite material in a non-conductive binder material.

12. The process as defined in claim 11, wherein said binder material is selected from poly (vinylidene fluoride), poly (tetra-fluoro-ethylene), polyvinyl fluoride, ethylene-propylene-diene copolymer, styrene-butadiene rubber, a copolymer thereof, a derivative thereof, or a combination thereof.

13. The process of claim 1, wherein said graphite oxide or graphite fluoride provides a specific capacity of no less than 500 mAh/g.

14. The process as defined in claim 1, wherein said graphite oxide or graphite fluoride provides a specific capacity of no less than 650 mAh/g.

15. The process as defined in claim 1, wherein said graphite oxide or graphite fluoride provides a specific capacity of no less than 750 mAh/g.

* * * * *